June 16, 1942. E. I. SHOBERT, 2D 2,286,315
GENERATOR REGULATOR
Filed June 21, 1941

WITNESSES.
a B Wallace.
V. A. Peckham.

INVENTOR.
Erle I. Shobert II
BY Brown, Critchlow & Flick
his ATTORNEYS.

Patented June 16, 1942

2,286,315

UNITED STATES PATENT OFFICE 2,286,315

GENERATOR REGULATOR

Erle I. Shobert, II, St. Marys, Pa., assignor to Stackpole Carbon Company, St. Marys, Pa., a corporation of Pennsylvania Application June 21, 1941, Serial No. 399,135

13 Claims. (Cl. 171—119)

This invention relates to apparatus for automatically regulating the output of generators, by which is meant either their voltage output or their current output, or both.

It is among the objects of this invention to regulate the output of a generator in a manner that under normal conditions does not require the opening and closing of an electric circuit and the destructive arcing resulting therefrom. Another object is to provide for the opening of the field circuit of the generator if the generator output attempts to exceed a predetermined value.

In accordance with this invention a small electric motor is driven by the generator being regulated with the field circuit of the motor connected to the generator's armature circuit, and with the armature circuit of the motor in series with the field circuit of the generator. As a result, the electromotive force generated by the motor is fed back upon the current in the generator field circuit and represses or curbs that current so that the output of the generator is restricted. To give control over the output of the generator, means is provided for preventing operation of the motor until the generator output reaches a predetermined value. This restraining means is controlled by the generator output itself. The motor then starts operating and the back electromotive force generated by it prevents the output of the generator from exceeding the desired value. In case the maximum electromotive force generated by the motor proves to be insufficient to hold the generator output down to the desired value, as at high generator speed with light load, one of the brushes of the apparatus is automatically moved out of engagement with its commutator, whereby the field circuit of the generator is broken momentarily so that the generator output is prevented from rising further.

Figure 1:
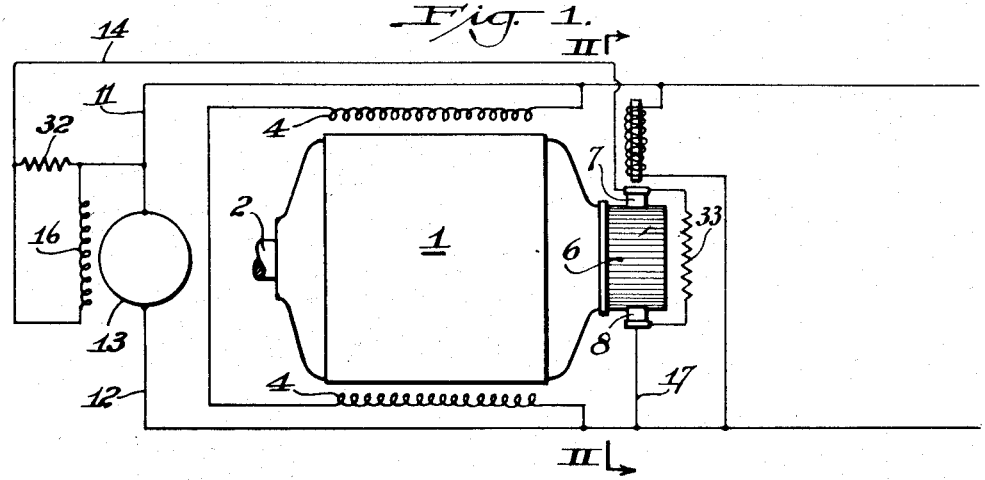
Figure 2:
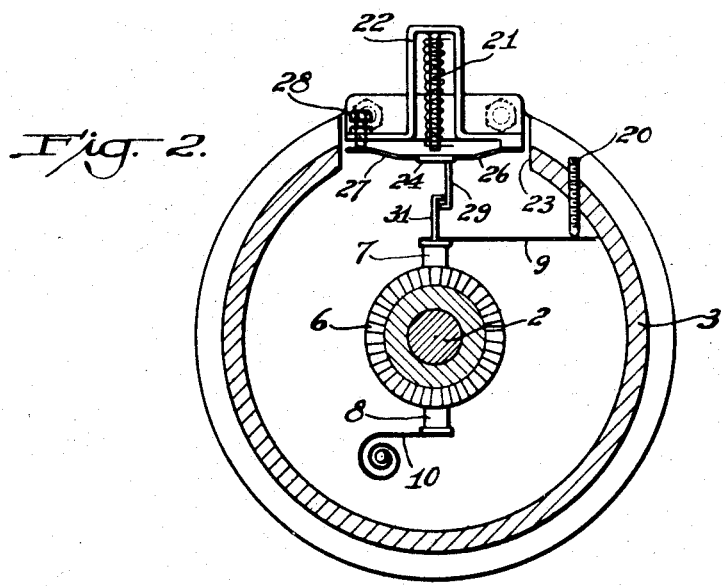
Figure 3:
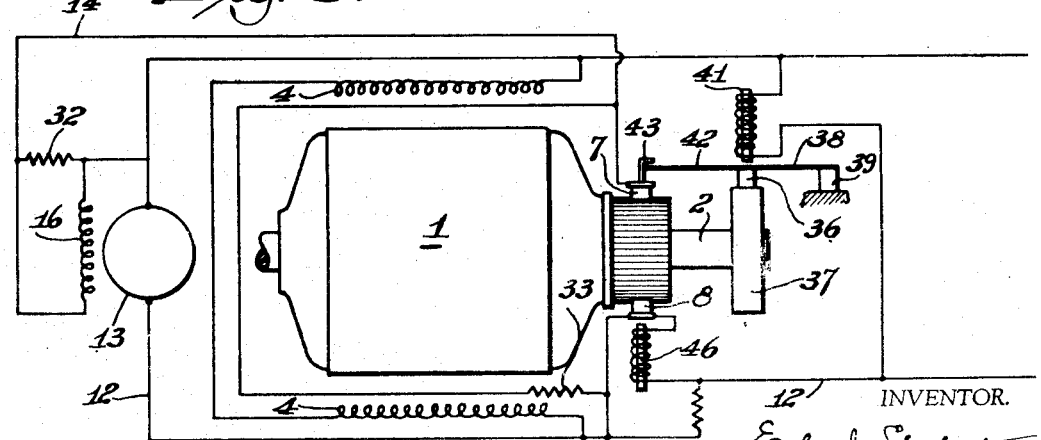

The invention is illustrated in the accompanying drawing, in which Fig. 1 is a diagrammatic view showing my regulating motor connected to a generator; Fig. 2 is a vertical section through the regulating motor taken along a plane corresponding to the line II—II of Fig. 1; and Fig. 3 is a diagrammatic view similar to Fig. 1 but showing a modification of this invention.

Referring to Figs. 1 and 2 of the drawing, a freely running motor armature 1 is mounted on a shaft 2 journaled in the opposite ends of a surrounding metal case 3. The field coils 4 of the motor are mounted adjacent the armature in the usual manner. At one end of the armature is the usual commutator 6 against which a pair of brushes 7 and 8 are pressed by springs 9 and 10, respectively, supported from the walls of the case, as shown in Fig. 2. This motor is most suitably much smaller than the generator that it is to regulate, and the inertia and friction of the motor are maintained as low as possible. The motor is shown in Fig. 1 connected to such a generator represented diagrammatically at the left of Fig. 1. As will be seen, the field coils of the motor are shunted across the wires 11 and 12 of the circuit of the generator's armature 13, and a wire 14 leading from one end of the field coil 16 of the generator is connected to the upper brush 7 of the motor, while the lower brush of the motor is connected by a wire 17 to generator wire 12. The motor brushes and commutator thus are in series with the generator's field circuit which is shunted across the armature circuit of the generator. Consequently, the electromotive force that is generated by the motor is fed back through brushes 7 and 8 into the field circuit of the generator where it represses the current in that circuit and thereby curbs the output of the generator.

In order to be able to generate any desired voltage or current and to prevent the output from exceeding that value, the motor is restrained from operating until the generator output reaches the desired value. One way of doing this is by adjusting the pressure of one of the brushes against the motor commutator to a point where the friction is sufficient to stall the motor until the output of the generator becomes great enough to relieve that pressure, through suitable electrically-actuated means, and thereby permit the motor to operate. Thus, as shown in Fig. 2, the pressure of the upper brush 7 against commutator 6 may be regulated by a set screw 20 threaded through the motor case 3 and bearing against the spring 9 that presses the upper brush against the motor commutator, or the set screw can be eliminated if spring 9 is made stiff enough to stall the motor. For decreasing the pressure of brush 7 against the commutator to permit the motor to operate, an electromagnet is connected in the armature circuit of the generator, in shunt for voltage regulation and in series for current regulation. This magnet comprises, as shown in Fig. 2, a solenoid 21 mounted in a bracket 22 attached to the inner surface of the end wall of the motor case above an opening 23 in the top wall thereof. When the solenoid, which is connected to the wires 11 and 12 leading from the generator, is energized it attracts a metal armature bar 24 that is supported by a short spring 26 attached to one side of the bracket. The resistance that the bar offers to being drawn upwardly against the solenoid is controlled by means of a leaf spring 27 attached to the opposite end of the bar and engaging the lower end of an adjustment screw 28 threaded in the adjacent end of the bracket. The solenoid is loosely connected to the upper brush of the motor by a lifting member 29 suspended from the bar 24 and having a laterally bent lower end forming a head projecting under a similar head spaced therefrom at the upper end of a hook 31 connected to brush 7. Thus the bar can rise a predetermined distance without disturbing the brush so that when the bar is in the position shown in Fig. 2 the upper brush will ride the commutator continually in the same manner as the lower brush. Screw 28 is so adjusted that the heads of the lifting member and hook will not engage each other unless the generator output begins to exceed the value desired.

In operation, as long as the generator output remains below a predetermined value the small regulating motor connected to it is prevented from operating by the pressure of brush 7 against commutator 6. The voltage necessary to start the motor running is determined by the adjustment of screw 28. When that voltage is reached the solenoid 21 will draw bar 24 toward it far enough to cause lifting member 29 and hook 31 to pull upwardly on brush 7 and thereby reduce its pressure against the commutator. The motor then is able to operate and to generate an electromotive force that feeds back into the field circuit of the generator. If this back electromotive force is not sufficient to prevent further rise in the generator voltage, the tendency of that voltage to increase will, through the solenoid, relieve still more the pressure of brush 7 against the commutator and the speed of the motor will therefore increase with a corresponding rise in the electromotive force generated by it. Under normal conditions a balance is reached between the output of the generator and the speed of the motor at which the back electromotive force curbs the generator voltage at substantially the point desired.

In the event that, due to an increase in generator speed and a decrease in load or to other causes, the maximum electromotive force generated by the motor is insufficient to prevent the generator force from increasing further, the solenoid lifts brush 7 so far that it is pulled entirely out of engagement with the motor commutator, whereby the field coil circuit of the generator is opened. The resulting immediate drop in voltage of the generator causes the solenoid to allow brush 7 to again be pressed against the commutator by spring 9 in order to close the circuit so that the drop in voltage will be checked and will start to increase again. By rapidly opening and closing the field coil circuit of the generator in this manner its voltage output is maintained substantially constant. It will be seen that if brush 7 is thus out of contact with the motor commutator a large enough proportion of time, the motor may actually stop running because of lack of current. When conditions change again so that the back electromotive force of the motor is able to keep the output of the generator down to the desired point the solenoid will permit brush 7 to ride the motor commutator continually with a pressure depending upon the motor speed required.

As illustrated in Fig. 1, a resistance element 32 is shunted across the field coil of the generator to absorb inductive voltage generated when the field coil circuit is open, and another resistance element 33 is connected to the motor brushes to help snuff the arc that may be formed when the upper brush is lifted from the commutator.

It will thus be seen that under normal operating conditions there is no repeated making and breaking of the circuit between brush 7 and the motor commutator, whereby destructive arcing at that point is avoided. On the other hand, when conditions require it, provision is made for breaking the field coil circuit of the generator to limit rise of the generator output.

In the embodiment of the invention shown in Fig. 3 the means by which the motor is prevented from operating until a predetermined output of the generator is reached consists of a friction brake formed by a block 36 frictionally engaging a ring 37 rigidly mounted on an extension of the motor shaft 2. A stiff spring 38 mounted on a suitable support 39 presses the block against the ring tightly enough to cause the friction to stall the motor. When the output of the generator reaches the desired amount the current through a solenoid 41 above the braking block 36 raises the block to reduce its pressure against ring 37 enough to permit the motor to start running. This solenoid may take the same form and be connected to block 36 in the same manner as solenoid 21 of Fig. 2. If the braking block is moved entirely out of engagement with the ring so that the motor is running at full speed, and yet the electromotive force generated by the motor is insufficient to restrict the generator output to the desired value, the block will be raised still farther until an arm 42 projecting laterally therefrom engages a hook 43 on the upper brush 7 of the motor and lifts that brush away from the motor commutator. This breaks the circuit to the generator field coil in the same manner and for the same purpose as described in connection with Figs. 1 and 2.

Fig. 3 also illustrates the manner in which my regulator can be used to regulate both voltage and current. The voltage of the generator is regulated by solenoid 41, but the current output may be controlled by a solenoid 46 connected in series in wire 12 from the generator. This solenoid may be connected to lower brush 8 in the same manner as solenoid 21 of Fig. 2 is connected to brush 7. When the current output of the generator starts to exceed the value for which solenoid 46 has been set, that solenoid moves brush 8 out of contact with the motor commutator and thereby breaks the field coil circuit of the generator, as previously explained in connection with brush 7.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. The combination with a generator, of an electric motor driven thereby and having its field circuit connected to the armature circuit of the generator, the armature circuit of the motor being in series with the field circuit of the generator, means restraining operation of said motor, and means for automatically releasing said restraining means when the generator output reaches a predetermined value, whereby the motor starts operating and the electromotive force generated by the motor curbs the current in the generator field circuit and thereby regulates the generator output.

2. The combination with a generator, of an electric motor driven thereby and having its field circuit connected to the armature circuit of the generator, the armature circuit of the motor being in series with the field circuit of the generator, a friction brake restraining operation of said motor, and means responsive to the generator output for retracting said brake to decrease said restraining friction when the electromotive force generated by the motor curbs the current in the generator field circuit and thereby regulates the generator output.

3. The combination with a generator, of an electric motor driven thereby and having its field circuit connected to the armature circuit of the generator, the armature circuit of the motor being in series with the field circuit of the generator, means pressing one of the motor brushes against the motor commutator with a predetermined force for restraining operation of said motor, and means for decreasing the pressure of said brush against the motor commutator when the generator output reaches a predetermined value, whereby the motor starts operating and the electromotive force generated thereby curbs the current in the generator field circuit and thereby regulates the generator output.

4. The combination with a generator, of an electric motor driven thereby and having its field circuit connected to the armature circuit of the generator, the armature circuit of the motor being in series with the field circuit of the generator, means pressing one of the motor brushes against the motor commutator with a predetermined force for restraining operation of said motor, and means for decreasing the pressure of said brush against the motor commutator when the generator output reaches a predetermined value, and for moving said brush out of engagement with said commutator if said generator output starts to exceed said value.

5. The combination with a generator, of an electric motor driven thereby and having its field circuit connected to the armature circuit of the generator, the armature circuit of the motor being in series with the field circuit of the generator whereby the electromotive force generated by the motor represses the current in the generator field circuit and thereby curbs the generator output, means restraining operation of said motor, and means responsive to the output of the generator for controlling the operation of said restraining means.

6. The combination with a generator, of an electric motor driven thereby and having its field circuit connected to the armature circuit of the generator, the armature circuit of the motor being in series with the field circuit of the generator, a brake restraining operation of said motor, and electrically actuated means connected to the armature circuit of the generator for disengaging said brake when the generator output reaches a predetermined value whereby the electromotive force generated by the motor curbs the current in the generator field circuit and thereby regulates the generator output.

7. The combination with a generator, of an electric motor driven thereby and having its field circuit connected to the armature circuit of the generator, the armature circuit of the motor being in series with the field circuit of the generator, a rotatable member rigidly connected to the motor armature for rotation therewith, a braking member pressed against said rotatable member for restraining rotation of the motor armature, and electromagnetic means connected to the generator armature circuit for moving said braking member away from said rotatable member when the generator output reaches a predetermined value, whereby the electromotive force generated by the motor curbs the current in the generator field circuit and thereby regulates the generator output.

8. The combination with a generator, of an electric motor driven thereby and having its field circuit connected to the armature circuit of the generator, the armature circuit of the motor being in series with the field circuit of the generator, a rotatable member rigidly connected to the motor armature for rotation therewith, a braking member, adjustable means pressing said braking member against said rotatable member with a force sufficient to prevent rotation of the motor armature, and electromagnetic means connected to the generator armature circuit for moving said braking member away from said rotatable member when the generator output reaches a predetermined value, whereby the electromotive force generated by the motor curbs the current in the generator field circuit and thereby regulates the generator output.

9. The combination with a generator, of an electric motor driven thereby and having its field circuit connected to the armature circuit of the generator, the armature circuit of the motor being in series with the field circuit of the generator whereby the electromotive force generated by the motor represses the current in the generator field circuit and thereby curbs the generator output, and means responsive to the output of the generator for moving one of the motor brushes out of engagement with its commutator if the generator field current is not repressed enough by said electromotive force to keep the generator output from exceeding the value desired.

10. The combination with a generator of an electric motor driven thereby and having its field circuit connected to the armature circuit of the generator, the armature circuit of the motor being in series with the field circuit of the generator whereby the electromotive force generated by the motor represses the current in the generator field circuit and thereby curbs the generator output, electrically actuated means operatively connected to one of the motor brushes for moving it out of engagement with its commutator if the generator output starts to exceed a predetermined value, and means for connecting said electrically actuated means to the generator armature circuit.

11. The combination with a generator, of an electric motor driven thereby and having its field circuit connected to the armature circuit of the generator, the armature circuit of the motor being in series with the field circuit of the generator, adjustable means pressing one of the motor brushes against the motor commutator with a predetermined force for restraining operation of said motor, and an electromagnet connected to the generator armature circuit and operatively connected to said brush for decreasing its pressure against the motor commutator when the generator output reaches a predetermined value, and for moving the brush out of engagement with said commutator after the motor reaches its maximum speed.

12. The combination with a generator, of an electric motor driven thereby and having its field circuit connected to the armature circuit of the generator, the armature circuit of the motor being in series with the field circuit of the generator, a rotatable member rigidly connected to the motor armature for rotation therewith, a braking member pressed against said rotatable member for restraining rotation of the motor armature, electromagnetic means connected to the generator armature circuit for moving said braking member away from said rotatable member when the generator output reaches a predetermined value, whereby the electromotive force generated by the motor curbs the current in the generator field circuit and thereby regulates the generator output, and means connected to said braking member for moving one of the motor brushes away from its commutator after the braking member is moved out of engagement with said rotatable member.

13. The combination with a generator, of an electric motor driven thereby and having its field circuit connected to the armature circuit of the generator, the armature circuit of the motor being in series with the field circuit of the generator, means restraining operation of said motor until the generator output reaches a predetermined value, whereby the electromotive force generated by the motor curbs the current in the generator field circuit and thereby regulates the generator output, and means for breaking the field circuit of the generator if said output starts to exceed said value.

ERLE I. SHOBERT, II.

CERTIFICATE OF CORRECTION.

Patent No. 2,286,315.  June 16, 1942.

ERLE I. SHOBERT, II.

It is hereby certified that error appears in the printed specification of the above numbered patent requiring correction as follows: Page 3, first column, line 18, claim 2, after the word "when" insert --the generator output reaches a predetermined value, whereby the motor starts operating and--; and that the said Letters Patent should be read with this correction therein that the same may conform to the record of the case in the Patent Office.

Signed and sealed this 28th day of July, A. D. 1942.

(Seal)

Henry Van Arsdale,
Acting Commissioner of Patents.